(12) United States Patent
Leo, Sr. et al.

(10) Patent No.: US 11,047,511 B2
(45) Date of Patent: Jun. 29, 2021

(54) WATER PIPE RETAINER

(71) Applicant: DA CLIP LLC, New Hudson, MI (US)

(72) Inventors: Artil A. Leo, Sr., Birmingham, MI (US); Dan Allor, South Lyon, MI (US)

( * ) Notice: Subject to any disclaimer, the term of this patent is extended or adjusted under 35 U.S.C. 154(b) by 0 days.

(21) Appl. No.: 16/021,732

(22) Filed: Jun. 28, 2018

(65) Prior Publication Data

US 2018/0306351 A1 Oct. 25, 2018

Related U.S. Application Data

(63) Continuation of application No. 15/615,519, filed on Jun. 6, 2017, now Pat. No. 10,060,556.
(Continued)

(51) Int. Cl.
*F16L 3/24* (2006.01)
*F16L 5/00* (2006.01)
*F16L 3/13* (2006.01)
*F16L 3/237* (2006.01)
*E04B 2/78* (2006.01)
(Continued)

(52) U.S. Cl.
CPC ............. *F16L 5/00* (2013.01); *F16L 3/13* (2013.01); *F16L 3/237* (2013.01); *F16L 3/24* (2013.01); *E04B 2/789* (2013.01); *E04B 2002/7488* (2013.01); *E04C 3/32* (2013.01); *F16L 3/06* (2013.01); *H02G 3/32* (2013.01)

(58) Field of Classification Search
CPC ... F16L 3/13; F16L 3/237; F16L 3/223; F16L 5/00; F16L 3/24; F16L 3/06; H02G 3/32; E04B 2/789

USPC ..... 248/72, 68.1, 74.2, 62, 63, 56; 174/68.1, 174/84 C, 153 G; 24/455; 439/449; 403/195
See application file for complete search history.

(56) References Cited

U.S. PATENT DOCUMENTS 2,663,895 A   7/1950 Bushing
2,897,533 A   2/1956 Bull et al.
(Continued)

FOREIGN PATENT DOCUMENTS

CA   2157090 A1   3/1996
DE   1903060      12/1970
(Continued)

OTHER PUBLICATIONS

International Preliminary Report on Patentability for International Application No. PCT/US2017/036183, dated Dec. 20, 2018.
(Continued)

*Primary Examiner* — Todd M Epps
(74) *Attorney, Agent, or Firm* — Carlson, Gaskey & Olds, P.C.

(57) ABSTRACT

A retainer for securing conduit or wire to an opening in metal stud includes a pair of outer retaining portions for securing the retainer to the metal stud. Each outer retaining portion includes a groove for receiving an edge of a panel of the metal stud. An inner retaining portion includes a base connecting the pair of outer retaining portions to one another. The inner retaining portion further includes a pair of retention members defining a retention area therebetween in which a conduit can be secured. Each retention member includes a flexible arm. Each of the outer retaining portions extends away from the base to a free end.

39 Claims, 7 Drawing Sheets

Related U.S. Application Data

(60) Provisional application No. 62/346,239, filed on Jun. 6, 2016.

(51) Int. Cl.
  *F16L 3/06* (2006.01)
  *H02G 3/32* (2006.01)
  *E04B 2/74* (2006.01)
  *E04C 3/32* (2006.01)

(56) References Cited

U.S. PATENT DOCUMENTS

| | | | |
|---|---|---|---|
| 2,937,834 A | 2/1959 | Orenick et al. | |
| 3,164,054 A | 1/1965 | Biesecker | |
| 3,285,551 A | 11/1966 | Tschanz | |
| 3,424,856 A * | 1/1969 | Coldren | H02G 3/0633 |
| | | | 174/153 G |
| 3,518,359 A | 6/1970 | Trimble et al. | |
| 3,788,655 A | 1/1974 | Hathaway | |
| 3,875,843 A | 4/1975 | Maeda et al. | |
| 4,137,602 A | 2/1979 | Klumpp, Jr. | |
| 4,188,003 A * | 2/1980 | Ramsey | F16L 5/00 |
| | | | 248/56 |
| 4,299,363 A | 11/1981 | Datschefski | |
| 4,407,042 A | 10/1983 | Schramme et al. | |
| 4,550,451 A | 11/1985 | Hubbard | |
| 4,675,937 A | 6/1987 | Mitomi | |
| 4,685,173 A | 8/1987 | Pavur | |
| 4,706,999 A | 11/1987 | Hynes | |
| 4,840,334 A | 6/1989 | Kikuchi | |
| 5,054,741 A | 10/1991 | Ismert | |
| 5,183,207 A | 2/1993 | Steinberg et al. | |
| 5,216,206 A | 6/1993 | Maesako | |
| 5,287,664 A | 2/1994 | Schiller et al. | |
| 5,460,342 A | 10/1995 | Dore et al. | |
| 5,488,198 A | 1/1996 | Kramer | |
| 5,537,714 A | 7/1996 | Lynch, Jr. et al. | |
| 5,626,316 A | 5/1997 | Smigel et al. | |
| 5,627,342 A | 6/1997 | Kramer | |
| 5,653,147 A | 8/1997 | Kelley et al. | |
| 5,669,590 A | 9/1997 | Przewodek | |
| 5,876,000 A | 3/1999 | Ismert | |
| 5,950,381 A | 9/1999 | Stansbie | |
| 6,088,876 A | 7/2000 | Daoud | |
| 6,126,122 A | 10/2000 | Ismert | |
| 6,147,307 A * | 11/2000 | Ling | H02G 3/18 |
| | | | 16/2.1 |
| 6,308,921 B1 | 10/2001 | Borzucki | |
| 6,446,915 B1 | 9/2002 | Ismert | |
| 6,598,835 B2 | 7/2003 | Minnick | |
| 6,675,439 B2 | 1/2004 | Hashimoto | |
| 6,901,627 B2 | 6/2005 | Uchida | |
| 7,011,277 B2 * | 3/2006 | Mizukoshi | F16L 3/223 |
| | | | 248/68.1 |
| 7,131,170 B2 * | 11/2006 | Weaver | A46B 17/02 |
| | | | 24/545 |
| 7,222,394 B2 | 3/2007 | Gardner | |
| 7,211,744 B2 | 5/2007 | Jorgensen | |
| 7,219,931 B2 | 5/2007 | Kato | |
| 7,608,782 B2 * | 10/2009 | Hill | H01R 4/646 |
| | | | 174/84 C |
| 7,615,714 B2 * | 11/2009 | Pyron | H02G 3/085 |
| | | | 174/660 |
| 7,658,350 B2 * | 2/2010 | Bauer | F16L 3/223 |
| | | | 248/65 |
| 7,802,762 B2 | 9/2010 | Bauer | |
| 7,896,296 B2 | 3/2011 | Julian et al. | |
| 7,930,800 B1 | 4/2011 | Castrale et al. | |
| 7,963,498 B2 | 6/2011 | Seymour et al. | |
| 8,157,223 B2 | 4/2012 | Stau et al. | |
| 8,261,409 B2 | 9/2012 | Magennis et al. | |
| 8,668,174 B2 * | 3/2014 | Kato | F16L 3/222 |
| | | | 248/74.2 |
| 8,701,246 B2 | 4/2014 | Allen | |
| 8,733,709 B2 | 5/2014 | Meyers et al. | |
| 8,910,912 B2 | 12/2014 | Child et al. | |
| 8,967,556 B2 | 3/2015 | Meyers et al. | |
| 8,973,216 B1 | 3/2015 | Ramirez | |
| 8,979,461 B2 | 3/2015 | Pearson et al. | |
| 9,127,740 B2 | 9/2015 | Shinoda | |
| 9,453,594 B2 | 9/2016 | Fiebich et al. | |
| 9,541,223 B2 | 1/2017 | Meyers et al. | |
| 10,060,556 B2 * | 8/2018 | Leo, Sr. | F16L 3/24 |
| 10,125,897 B2 | 11/2018 | Schmidt | |
| 2002/0038492 A1 | 4/2002 | Hashimoto | |
| 2004/0144897 A1 * | 7/2004 | Maruyama | F16B 21/073 |
| | | | 248/68.1 |
| 2006/0000953 A1 | 1/2006 | Ismert et al. | |
| 2006/0200936 A1 | 9/2006 | Gardner | |
| 2007/0026735 A1 | 2/2007 | Pyron et al. | |
| 2008/0067294 A1 | 3/2008 | Heller et al. | |
| 2008/0203247 A1 | 8/2008 | Hill | |
| 2009/0114776 A1 | 5/2009 | Julian et al. | |
| 2010/0139035 A1 | 6/2010 | Magennis et al. | |
| 2013/0146720 A1 * | 6/2013 | Meyers | F16L 3/223 |
| | | | 248/68.1 |

FOREIGN PATENT DOCUMENTS

| | | |
|---|---|---|
| EP | 76578 | 4/1983 |
| GB | 2451426 | 2/2009 |
| WO | 2013040363 A2 | 3/2013 |

OTHER PUBLICATIONS

IPS 2011 Flyer.

* cited by examiner

WATER PIPE RETAINER

BACKGROUND

Metal studs are often used in new construction or remodeling instead of wood studs. The metal studs are sheet metal formed into a stud shape. Some metal studs include a front panel, with two side panels extending perpendicularly from side edges of the front panel. The front panel may have an opening for routing wires and/or conduit (such as water pipes) through the metal studs. Currently, a grommet must be installed in each of the openings through which a conduit or wire is routed. The grommet is secured by screws in a time-consuming process.

SUMMARY

A retainer according to one embodiment disclosed herein more quickly and easily secures conduit or wire to an opening in metal stud. The retainer includes a pair of outer retaining portions for securing the retainer to the metal stud. Each outer retaining portion includes a groove for receiving an edge of a panel of the metal stud, such as via a snap-fit. The grooves secure the retainer to the metal stud.

An inner retaining portion of the retainer includes a base connecting the pair of outer retaining portions to one another. The inner retaining portion further includes a pair of retention members defining a retention area therebetween in which a conduit can be secured. Each retention member includes a flexible arm.

The retainer may include another pair of retention members for securing another conduit or cable to the retainer. The retainer may be molded as a single piece of plastic and may snap-fit into the opening in the metal stud for quick installation.

DETAILED DESCRIPTION OF A PREFERRED EMBODIMENT

Figure 1:
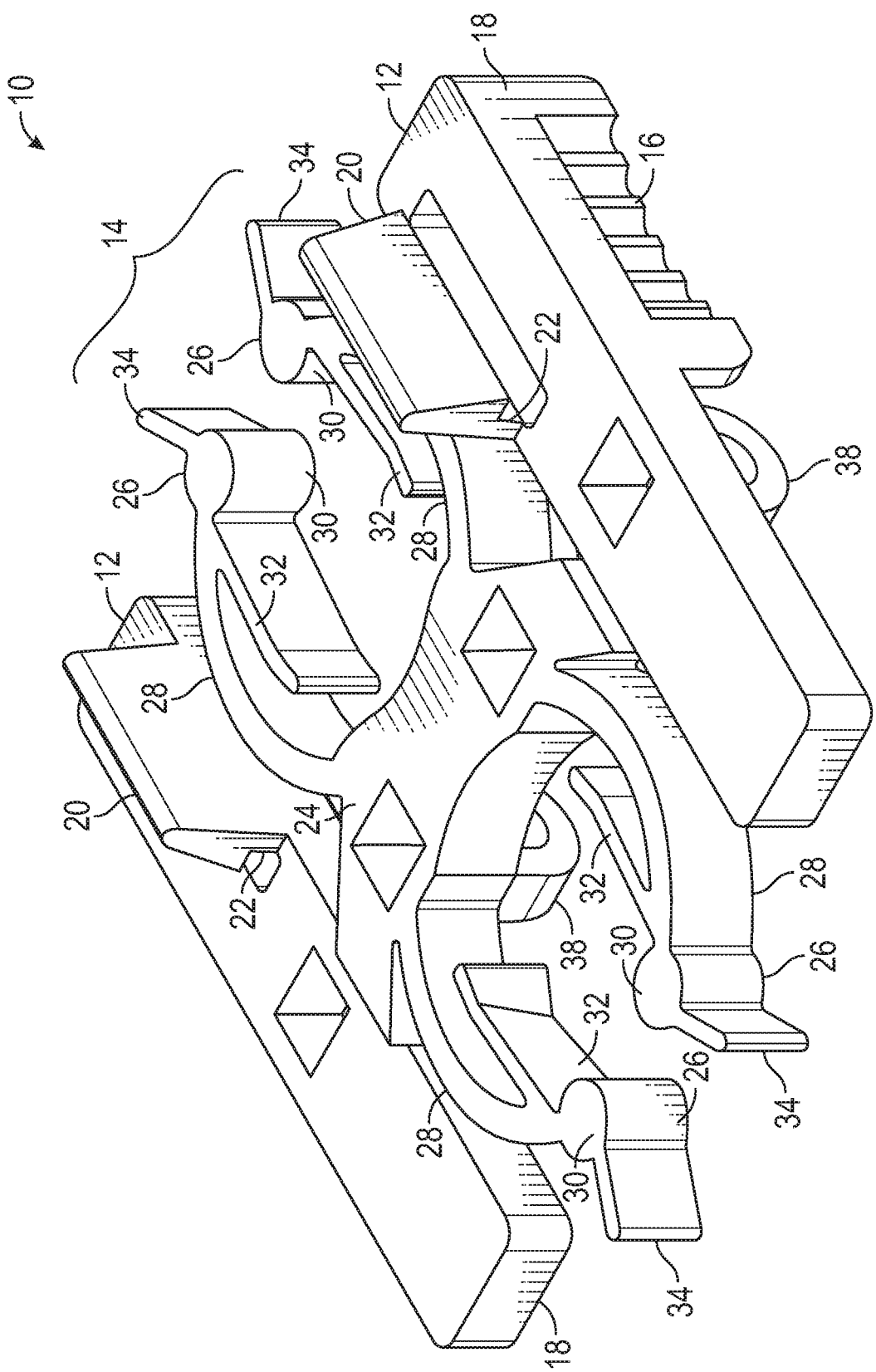
FIG. 1 is a perspective view of a retainer according to one embodiment.

A retainer 10 according to one embodiment is shown in FIG. 1. The example retainer 10 is molded as a single piece of plastic and includes a pair of outer retaining portions 12 and an inner retaining portion 14 between the outer retaining portions 12. The outer retaining portions 12 each include a gripping portion 16 protruding forward of a mid-portion 18. A tapered snap 20 protrudes rearward from the mid-portion 18 and defines a groove 22 between the tapered snap 20 and the mid-portion 18. The gripping portion 16 may be concave and be textured, such as corrugations or ribs.

The outer retaining portions 12 are generally elongated and parallel to one another and secured to one another by a base 24. The base 24 connects to an inner surface of each outer retaining portion 12 generally offset from the middle of each outer retaining portion 12, leaving two opposite free ends of each outer retaining portion 12. In this manner, the outer retaining portions 12 can pivot about the connections to the base 24 in response to the compression of the gripping portions 16. Together, the base 24 and outer retaining portions 12 provide generally an "H" shape.

Extending from opposite sides of the base 24 are two pair of flexible retention members 26. Each retention member 26 includes a flexible curved arm 28 extending from the base 24 to define a retention area between each pair of retention members 26. At outer ends of each curved arm 28 is a cylindrical contact member 30, which provides a rounded surface for engaging a conduit being pressed into the retention area. A retention finger 32 projects from each cylindrical contact member 30 back toward the base 24 within the retention area. A guide tab 34 projects outward at an angle from each cylindrical contact member 30 to guide a conduit being pressed into the retention area.

A plurality of loops 38 project from the base 24 and the mid-portions 18 of the outer retaining portions 12. The loops 38 project forward of the mid-portion 18 of the outer retaining portion 12.

Figure 2:
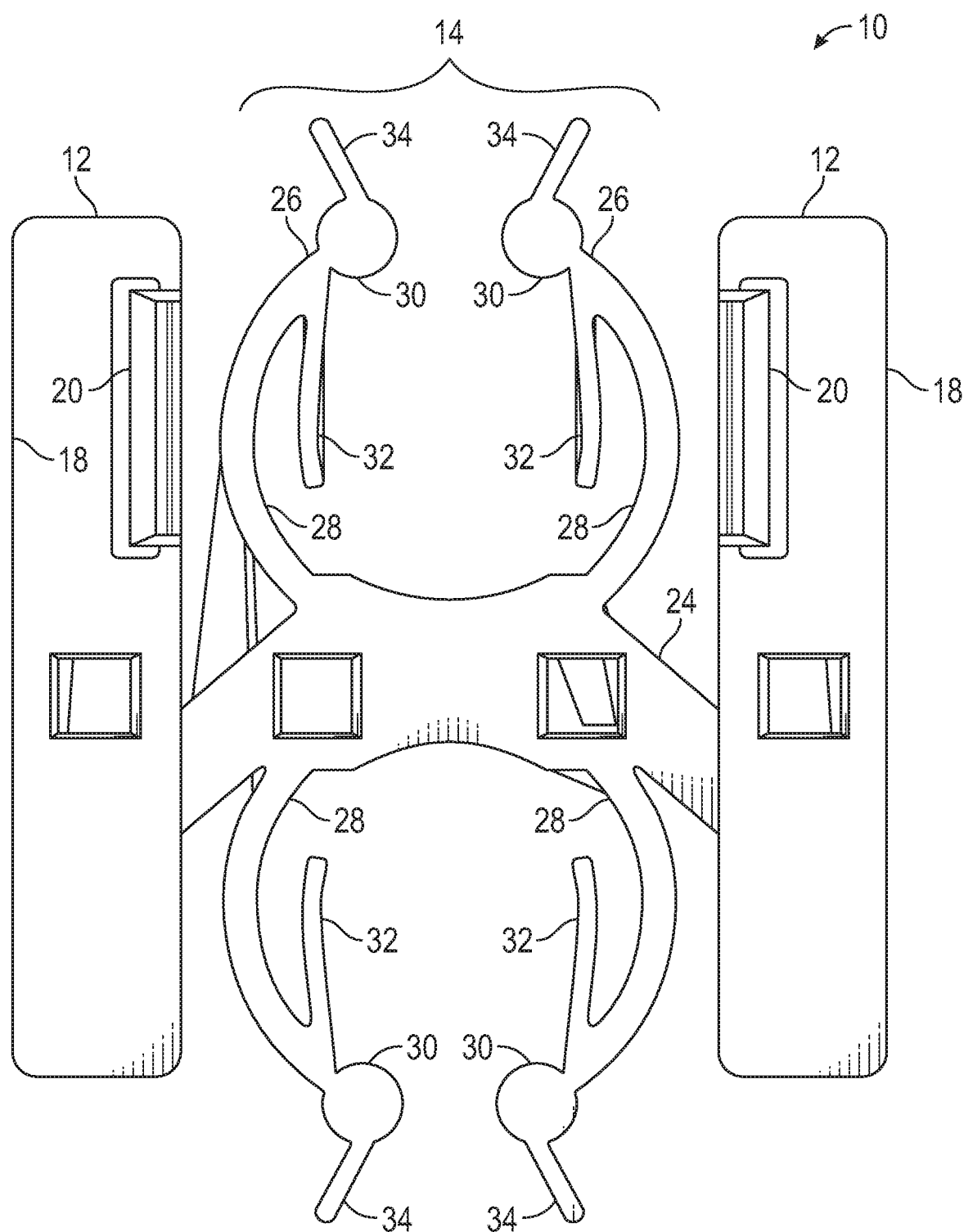
FIG. 2 is a rear view of the retainer of FIG. 1.

FIG. 2 is a rear view of the retainer 10. As shown, the base 24 may angle downward (i.e. away from the snaps 20) as it extends from a central portion toward the outer retaining portions 12.

Figure 3:
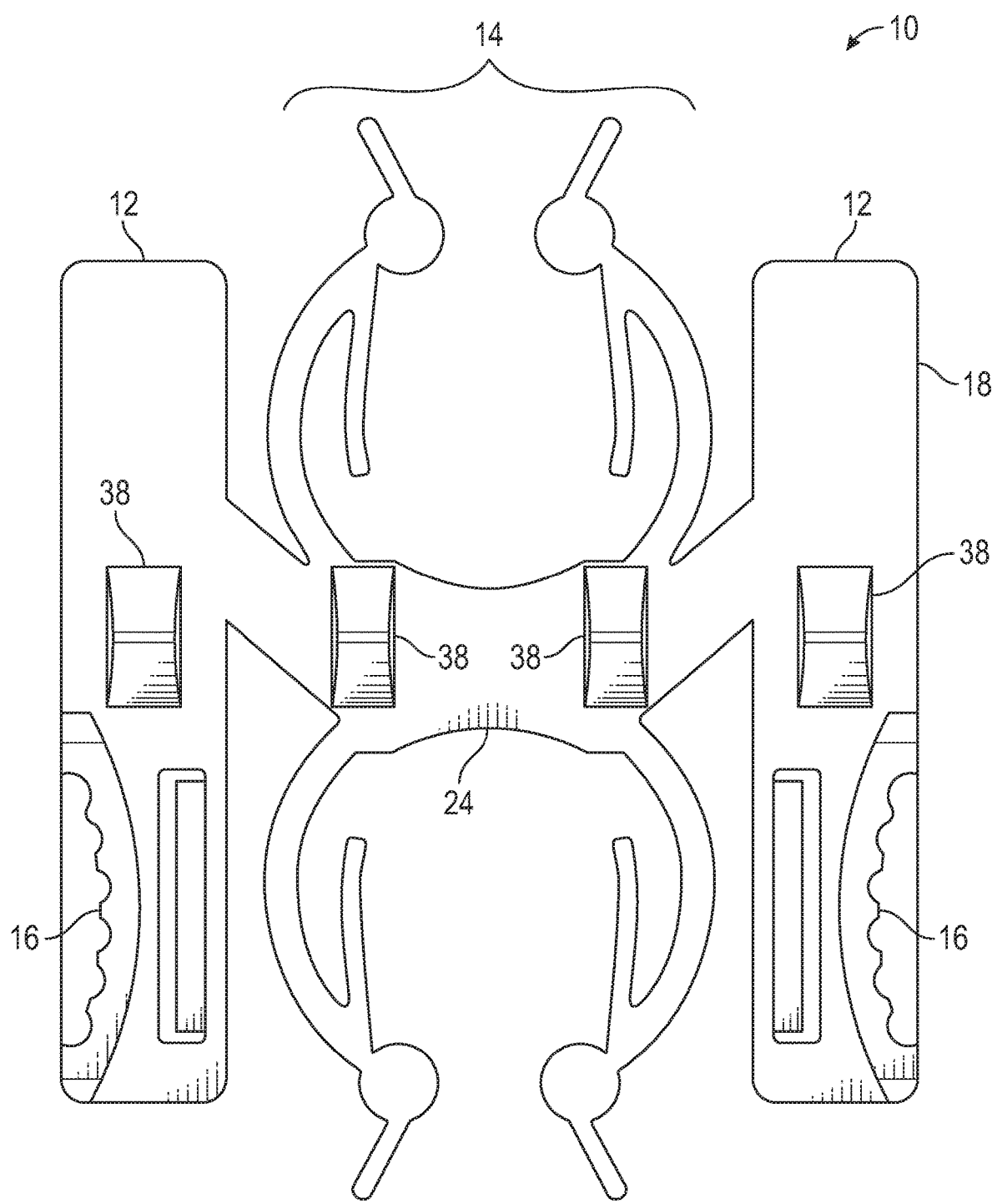
FIG. 3 is a front view of the retainer of FIG. 1.

FIG. 3 is a front view of the retainer 10. The four loops 38 are aligned, with one loop 38 on each outer retaining portion 12 and two on the base 24. Outer surfaces of the gripping portions 16 are concave, curving inward toward one another.

Figure 4:
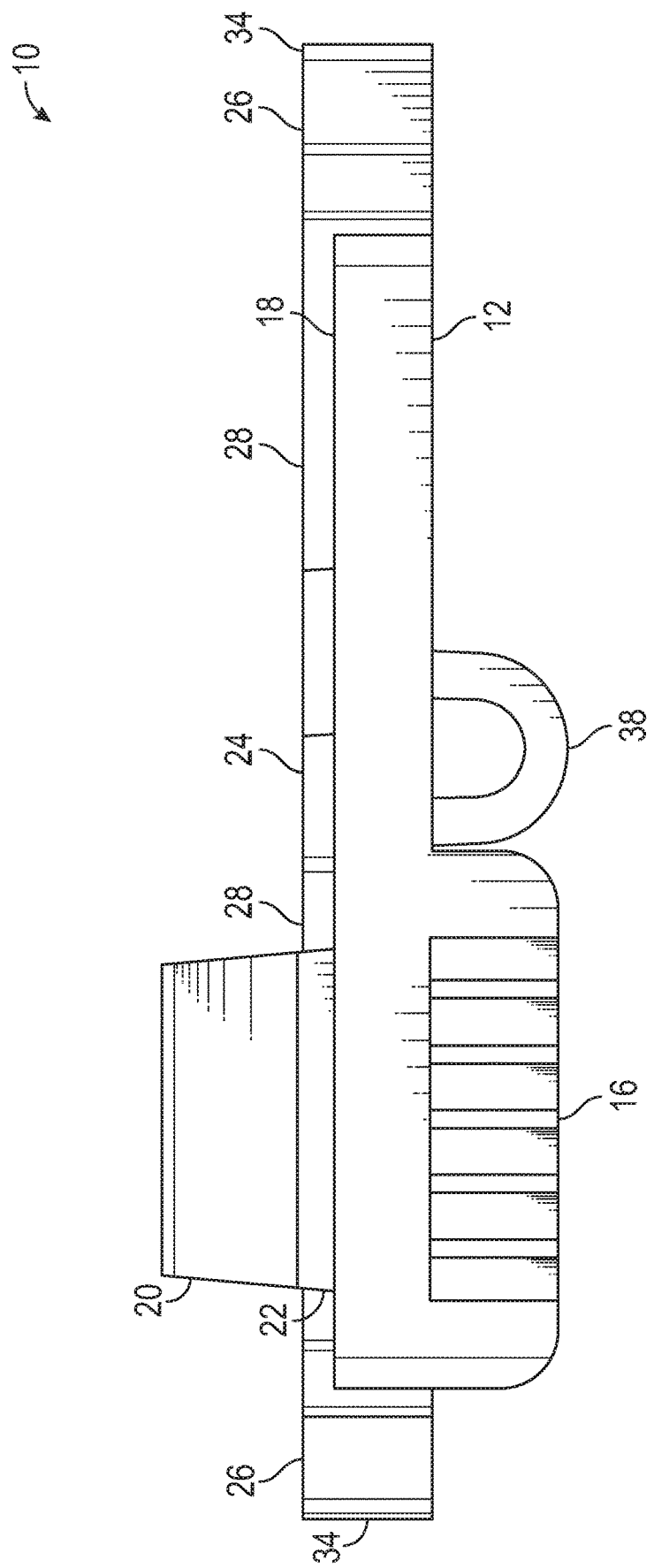
FIG. 4 is a side view of the retainer of FIG. 1.

FIG. 4 is a side view of the retainer 10. The central portion of the base 24 protrudes rearwardly more than do the mid-portions 18 of the outer retaining portions 12. The retention members 26 may be offset rearwardly of the mid-portion 18 of the outer retaining portions 12, such that the retention members 26 partially align with or overlap the grooves 22. As shown, the loops 38 are offset from the gripping portions 16 so that there is clear access to the loops 38.

Figure 5:
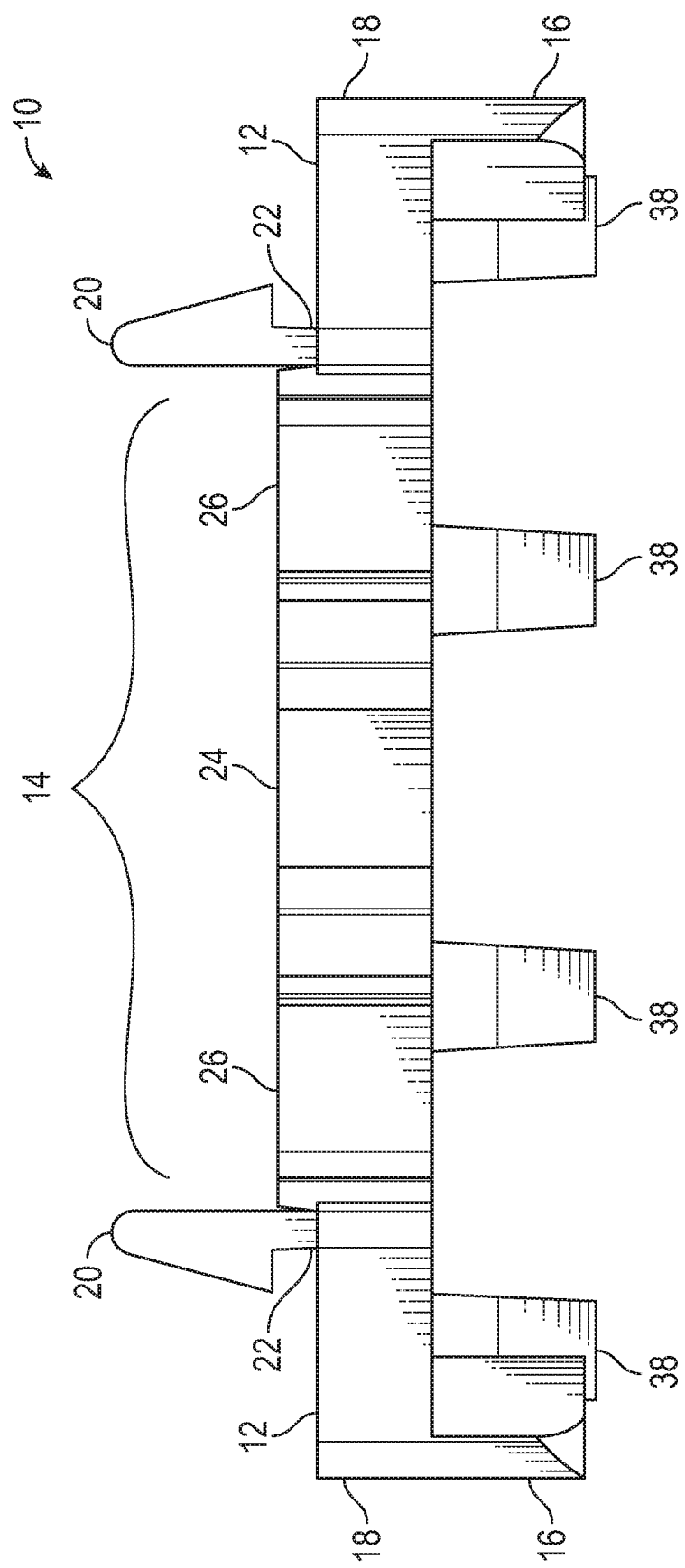
FIG. 5 is a top view of the retainer of FIG. 1.

FIG. 5 is a top view of the retainer 10. The snaps 20 define grooves 22 opening outwardly of the retainer 10. The rear surface of the mid-portions 18 of the outer retaining portions 12 does not project rearwardly of the grooves 22.

Figure 6:
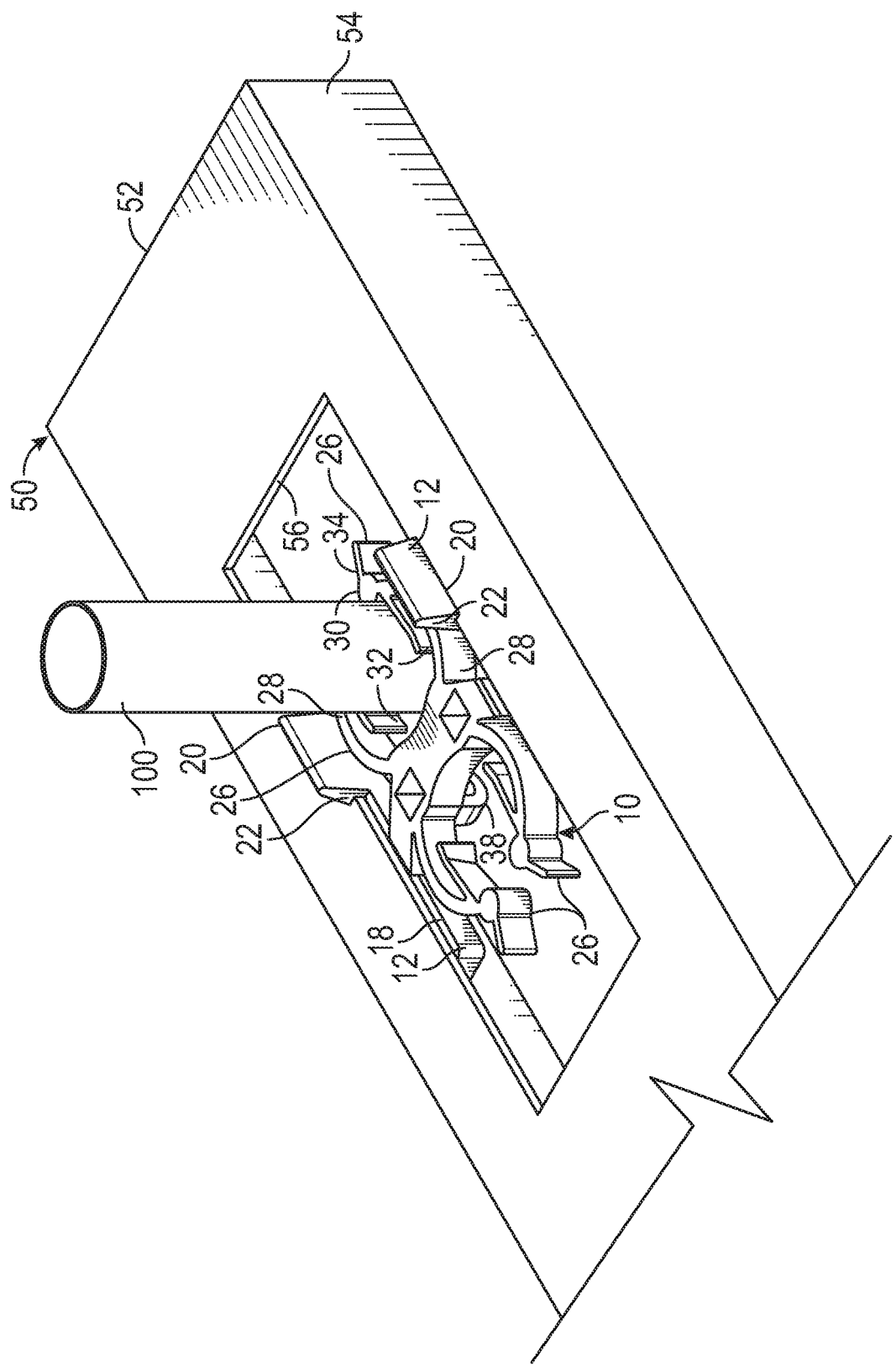
FIG. 6 is a perspective view of FIG. 1 installed in metal stud and securing a conduit thereto.

FIG. 6 is a perspective view of an example of a metal stud 50 having a front panel 52 and side panels 54 extending perpendicularly therefrom. A knockout or opening 56 is formed in the front panel 52. The retainer 10 may be secured in the opening 56 in the front panel 52 of the metal stud 50. To install the retainer 10, the gripping portions 16 (FIG. 1) of the retainer 10 are squeezed toward one another while inserting the snaps 20 through the opening 56 until the front panel 52 stops in contact with the mid-portions 18 of the outer retaining portions 12. In this position, the grooves 22 are aligned with the front panel 52. When the gripping portions 16 are released, they are resiliently biased back outward against the front panel 52 and the front panel 52 is received securely in the grooves 22. This secures the retainer 10 in the metal stud 50.

The retainer 10 can then receive a conduit or pipe 100 within the inner retaining portion 14. The pipe 100 can be snap-fit through the guide tabs 34, past the cylindrical contact members 30 and into the retention area between the retention fingers 32. The pipe 100 is held in place by the retention fingers 32 and the cylindrical contact members 30 of the retention members 26. The other pair of retention members 26 can secure another conduit or wire. The retention members 26 are between the conduit or wire and the edges of the front panel 52. The loops 38 can be used to retain wire through the loops.

Figure 7:
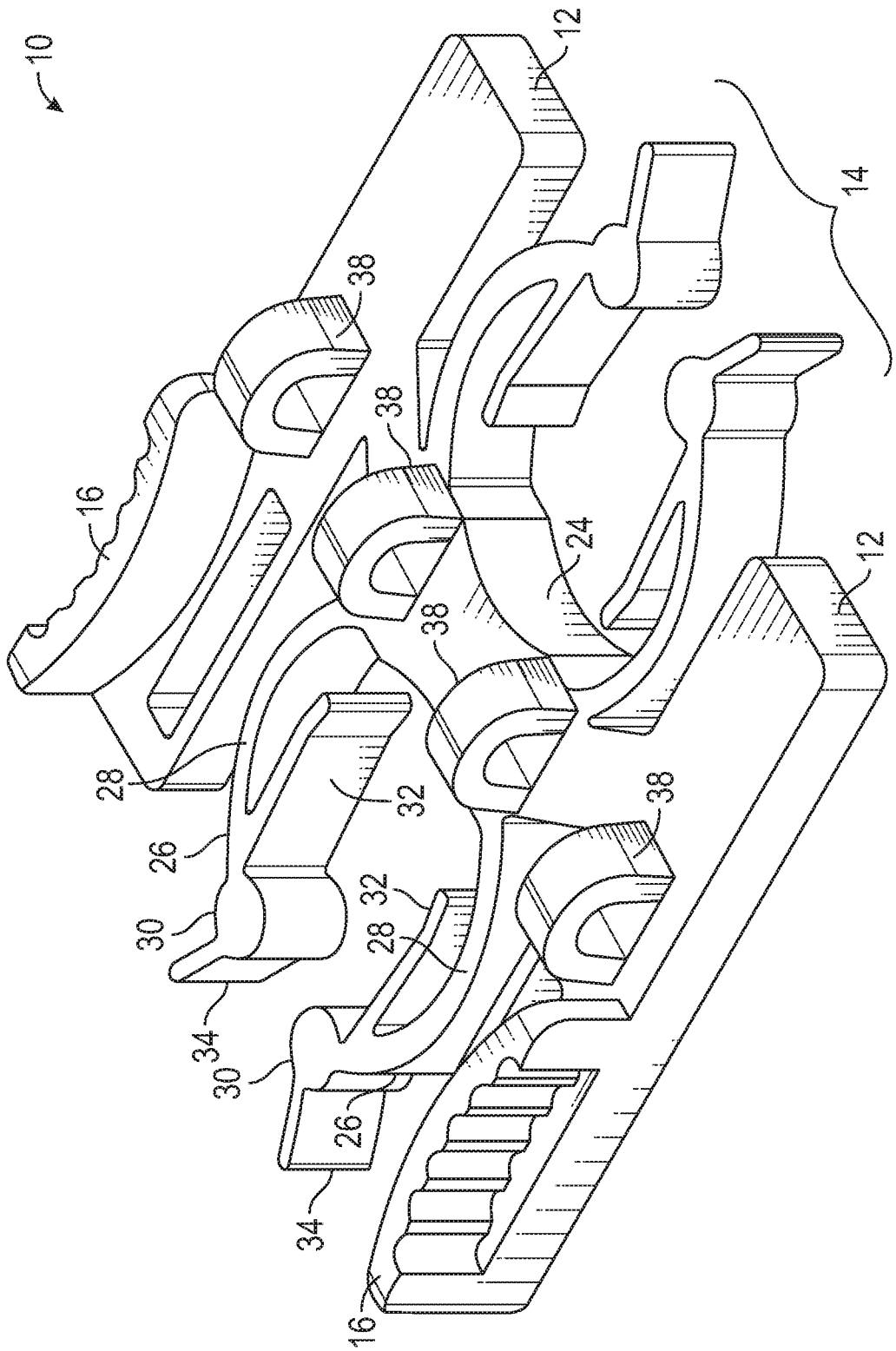
FIG. 7 is a bottom perspective view of the retainer of FIG. 1.

The retainer 10 is inexpensive, but quick and easy to install. The retainer 10 will securely hold conduit of various sizes or wire of various sizes in the metal stud 50. FIG. 7 is a bottom perspective view of the retainer of FIG. 1.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope. For example, one of the pairs of retention members 26 could be sized differently from the other, to provide sizing options.

What is claimed is:

1. A retainer for securing conduit to a stud, the retainer comprising:
   a base;
   a pair of outer retaining portions configured to snap-fit the retainer to a panel of the stud, the pair of outer retaining portions extending upward from the base; and
   a first pair of arms between which a conduit transverse to the panel of the stud can be received, the first pair of arms formed integrally with the outer retaining portions, the first pair of arms extending upward from the base, wherein the first pair of arms is spaced inward of the outer retaining portions; and
   a retention finger extending downward from outer ends of each of the first pair of arms.

2. The retainer of claim 1 wherein the pair of outer retaining portions and the first pair of arms are co-planar.

3. The retainer of claim 1 further including a guide tab extending outward from the outer ends of each of the first pair of arms and wherein the conduit can be snap-fit between the first pair of arms.

4. A retainer for securing conduit to a stud, the retainer comprising:
   a base;
   a pair of outer retaining portions for securing the retainer to the stud, the pair of outer retaining portions extending upward from the base;
   a first pair of arms between which a conduit can be snap-fit, the first pair of arms formed integrally with the outer retaining portions, the first pair of arms extending upward from the base, wherein the first pair of arms is between the outer retaining portions; and
   a second pair of flexible arms extending downward from the base.

5. A retainer and metal stud in combination:
   the retainer including a base, the retainer further including a pair of outer retaining portions for securing the retainer to the stud, the pair of outer retaining portions extending upward from the base, the retainer further including a first pair of arms between which a conduit can be snap-fit, the first pair of arms formed integrally with the outer retaining portions, the first pair of arms extending upward from the base, wherein the first pair of arms is between the outer retaining portions; and
   the metal stud having a panel, wherein the panel is received in a groove in each of the outer retaining portions.

6. The retainer and metal stud of claim 5 in combination with a conduit secured by the outer retaining portion.

7. The retainer, metal stud and conduit of claim 6 wherein the conduit is perpendicular to the panel of the metal stud.

8. The retainer and metal stud of claim 5 wherein the panel includes a pair of opposed parallel edges received in the grooves in the outer retaining portions.

9. A retainer for securing conduit to a stud, the retainer comprising:
   a base;
   a pair of outer retaining portions configured to snap-fit the retainer to a panel of the stud, the pair of outer retaining portions extending upward from the base;
   a first pair of arms between which a conduit transverse to the panel of the stud can be received, the first pair of arms formed integrally with the outer retaining portions and the base, the first pair of arms extending upward from the base, wherein the first pair of arms is between the outer retaining portions; and
   a second pair of arms extending downward from the base for receiving a second conduit therebetween.

10. The retainer of claim 9 wherein the base, the pair of outer retaining portions and the first pair of arms are integrally molded as a single piece of plastic.

11. A retainer for securing conduit or wire to a panel, the retainer comprising:
    a pair of outer retaining portions for securing the retainer to the panel, each outer retaining portion including a groove for receiving an edge of the panel, the grooves extending in a first plane; and
    a pair of flexible arms extending between the pair of outer retaining portions to define a retention area therebetween in which a conduit can be secured, wherein the pair of flexible arms extend and are capable of flexing in a second plane parallel to the first plane.

12. The retainer of claim 11 wherein each of the pair of flexible arms is curved and wherein each flexible arm further includes a retention finger extending from an outer end of the flexible arm toward the base.

13. The retainer of claim 12 wherein each flexible arm further includes a guide tab extending outward from the outer end of the flexible arm.

14. The retainer of claim 11 in combination with a metal stud having the panel, wherein the panel is received in the grooves of the outer retaining portions.

15. The retainer and metal stud of claim 14 in combination with a conduit secured by the pair of flexible arms.

16. The retainer of claim 11 wherein the pair of outer retaining portions and the pair of flexible arms are integrally molded as a single piece of plastic.

17. The retainer of claim 11 wherein the pair of flexible arms is a first pair of flexible arms, the retainer further including a second pair of flexible arms for receiving a second conduit therebetween.

18. The retainer of claim 11 further including a guide tab extending outward from an outer end of the flexible arm.

19. A method for installing a conduit in a metal stud including the steps of:
    inserting a conduit through an opening through a panel of the metal stud;
    snap-fitting a retainer into the opening formed through the panel of the metal stud by inserting the panel of the metal stud into grooves on the pair of outer retaining portions of the retainer; and
    snap-fitting the conduit to the retainer in the opening.

20. The method of claim 19 wherein snap-fitting the retainer into the opening is performed before inserting the conduit through the opening through the panel.

21. The method of claim 19 wherein the retainer includes:
a base
a pair of outer retaining portions for securing the retainer to the metal stud, the pair of outer retaining portions extending in a first direction from the base, wherein the step of snap-fitting the retainer includes snap-fitting the pair of outer retaining portions to the panel of the metal stud; and
a first pair of arms between which the conduit can be snap-fit, the first pair of arms formed integrally with the outer retaining portions and extending in the first direction from the base, wherein the first pair of arms is between the outer retaining portions.

22. A retainer for securing conduit to a stud, the retainer comprising:
a base;
a pair of outer retaining portions for securing the retainer to the stud, the pair of outer retaining portions extending upward from the base; and
an inner retaining portion into which a conduit can be snap-fit, the inner retaining portion formed integrally with the outer retaining portions, the inner retaining portion extending upward from the base, the inner retaining portion including a first pair of arms between which the conduit can be snap-fit, wherein the inner retaining portion is between the outer retaining portions, the inner retaining portion further including a second pair of flexible arms extending downward from the base.

23. In combination:
a retainer for securing conduit to a stud, the retainer comprising a base, a pair of outer retaining portions for securing the retainer to the stud, the pair of outer retaining portions extending upward from the base, the retainer further including an inner retaining portion into which a conduit can be snap-fit, the inner retaining portion formed integrally with the outer retaining portions, the inner retaining portion extending upward from the base, the inner retaining portion including at least one flexible arm, wherein the inner retaining portion is between the outer retaining portions; and
a metal stud having a panel, wherein the panel is received in a groove in each of the outer retaining portions.

24. The combination of claim 23 wherein the at least one flexible arm includes a first pair of arms between which the conduit can be snap-fit.

25. The combination of claim 24 wherein the pair of outer retaining portions and the first pair of arms are co-planar.

26. The combination of claim 25 the inner retaining portion further including a second pair of flexible arms extending downward from the base.

27. In combination, a metal stud and a retainer for securing conduit to the metal stud:
the retainer including a pair of outer retaining portions for securing the retainer to a panel of the metal stud, each outer retaining portion including a groove for receiving an edge of the panel and a concave gripping portion on an outer surface of the each outer retaining portion, wherein the edges of the panel received in the grooves of the outer retaining portions are parallel to one another, wherein edges of the panel are received in the grooves of the outer retaining portions, the retainer further including a pair of flexible arms formed integrally with the pair of outer retaining portions to define a retention area therebetween in which a conduit can be secured.

28. The retainer and metal stud of claim 27 in combination with a conduit secured by the pair of flexible arms.

29. A retainer for securing conduit to a stud, the retainer comprising:
a pair of outer retaining portions;
a pair of flexible arms defining a retention area therebetween in which a conduit can be secured, wherein the pair of flexible arms extend and are capable of flexing in a plane; and
a plurality of aligned loops formed integrally with the pair of outer retaining portions and the pair of flexible arms, wherein openings through the plurality of aligned loops are aligned along a line parallel to the plane.

30. The retainer of claim 29 wherein each of the pair of flexible arms is curved and wherein each flexible arm further includes a retention finger extending inward from an outer end of the flexible arm.

31. The retainer of claim 29 in combination with a metal stud having the panel, wherein the panel is received in the grooves of the outer retaining portions.

32. The retainer and metal stud of claim 31 in combination with a conduit secured between the pair of flexible arms.

33. The retainer of claim 29 further including a guide tab extending outward from an outer end of each flexible arm, wherein the guide tabs extend at angles outward and away from one another.

34. The retainer of claim 33 wherein each of the pair of flexible arms is curved and wherein each flexible arm further includes a retention finger extending inward from the outer end of the flexible arm.

35. A retainer for securing conduit to a stud, the retainer comprising:
a pair of outer retaining portions for securing the retainer to the panel, each outer retaining portion including a groove for receiving one of a pair of straight parallel edges of the panel on either side of an opening through the panel, the grooves extending in a first plane; and
a pair of flexible arms spaced inward of the pair of outer retaining portions to define a retention area therebetween in which a conduit can be secured, the pair of flexible arms formed integrally with the pair of outer retaining portions, wherein the pair of flexible arms extend and are capable of flexing in a second plane parallel to the first plane.

36. The retainer of claim 35 wherein each of the pair of flexible arms is curved and wherein each flexible arm further includes a retention finger extending from an outer end of the flexible arm toward the base.

37. The retainer of claim 36 wherein each flexible arm further includes a guide tab extending outward from the outer end of the flexible arm.

38. The retainer of claim 35 in combination with a metal stud having the panel, wherein the panel is received in the grooves of the outer retaining portions.

39. The retainer and metal stud of claim 38 in combination with a conduit secured by the pair of flexible arms and extending perpendicularly to the panel.

* * * * *

UNITED STATES PATENT AND TRADEMARK OFFICE
CERTIFICATE OF CORRECTION

PATENT NO. : 11,047,511 B2  
APPLICATION NO. : 16/021732  
DATED : June 29, 2021  
INVENTOR(S) : Artil A. Leo, Sr. and Dan Allor Page 1 of 1

It is certified that error appears in the above-identified patent and that said Letters Patent is hereby corrected as shown below:

In the Claims

In Claim 12, Column 4, Line 36; replace "the base" with --a base--

In Claim 19, Column 4, Line 60; replace "the pair" with --a pair--

In Claim 31, Column 6, Line 23; replace "the panel" with --a panel--

In Claim 31, Column 6, Line 23-24; replace "the grooves" with --grooves--

In Claim 35, Column 6, Line 38; replace "the panel" with --a panel--

In Claim 36, Column 6, Line 52; replace "the base" with --a base--

Signed and Sealed this  
Twelfth Day of April, 2022

Drew Hirshfeld  
*Performing the Functions and Duties of the  
Under Secretary of Commerce for Intellectual Property and  
Director of the United States Patent and Trademark Office*